Sept. 27, 1966 C. D. BERGER 3,275,858
HOT WIRE MOTOR WHICH OSCILLATES AT THE
SAME FREQUENCY AS THE INPUT
Filed July 16, 1963 3 Sheets-Sheet 2

Sept. 27, 1966            C. D. BERGER            3,275,858
HOT WIRE MOTOR WHICH OSCILLATES AT THE
SAME FREQUENCY AS THE INPUT Filed July 16, 1963            3 Sheets-Sheet 3 ic Office 3,275,858
Patented Sept. 27, 1966

3,275,858
HOT WIRE MOTOR WHICH OSCILLATES AT THE SAME FREQUENCY AS THE INPUT
Christian D. Berger, North Canton, Ohio, assignor to The Hoover Company, North Canton, Ohio, a corporation of Ohio
Filed July 16, 1963, Ser. No. 295,464
10 Claims. (Cl. 310—4)

My present invention relates particularly to a simple electro-thermal synchronous motor which is inexpensive and thoroughly reliable in operation and is particularly adapted to the driving of low level loads, such as electric clocks, which must operate precisely in synchronism with the frequency of the applied current.

It is a more particularly object of my invention to provide a small size electro-thermal synchronous motor powered by a fine resistance wire having dimensions such that it will exhibit a wide range temperature excusion synchronously with an applied alternating current such as 50 or 60 cycles which are commonly used for household it will exhibit a wide range temperature excursion synchronously with the applied voltage and is used to operate a ratchet mechanism. The rotary motion of the ratchet may then be connected mechanically by appropriate gearing to drive a low level load such as clock hands.

I have discovered that fine wires, preferably made of materials such as stainless steel or nickel chromium heater wire alloys, will synchronously heat and cool at a rate as high as 120 times per second and swing through a wide temperature range with resultant expansion and contraction. However, I prefer to insert a rectifying means in series with the wire in order that it will receive 60 spaced-apart current pulses per second, assuming 60 cycle alternating current supply, and have 60 like periods of time within which to cool while not electrically energized.

It is another object of my invention so to design and construct the ratchet and pawl driving mechanism which is operated by the expansion and contraction of the fine wire that the same is thoroughly reliable and yet need not be constructed with extremely fine tolerances or extremely fine parts such as are normally associated with the clock and watchmaking art.

Figure 1:
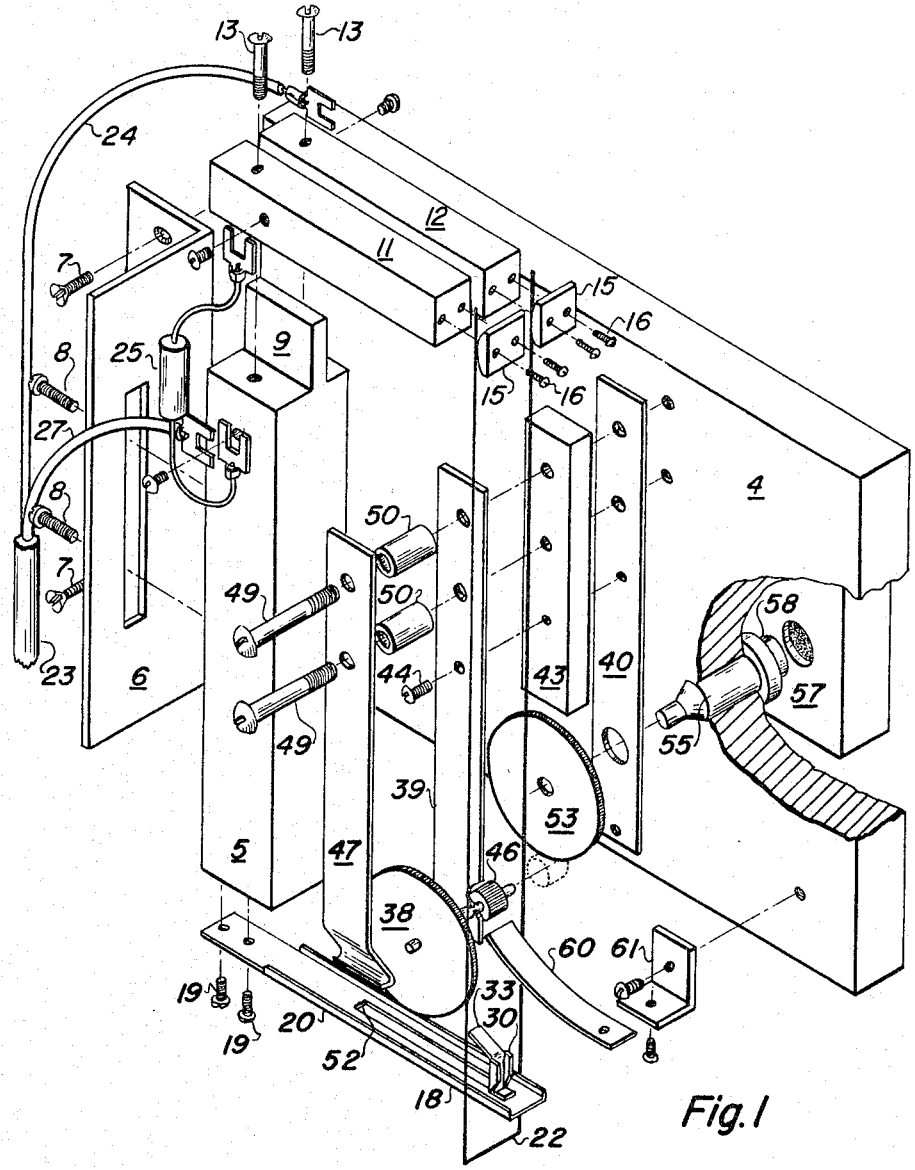
Figures 4, 11:
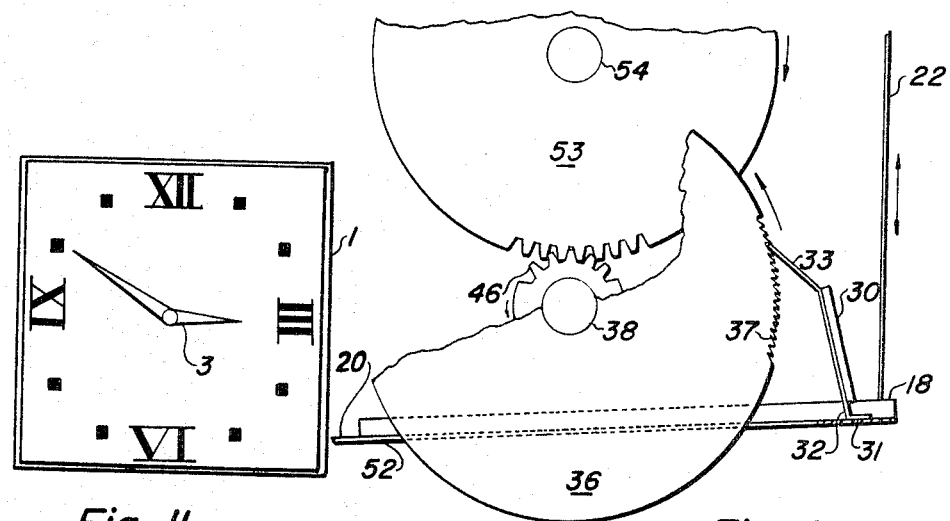
Figures 2, 3:
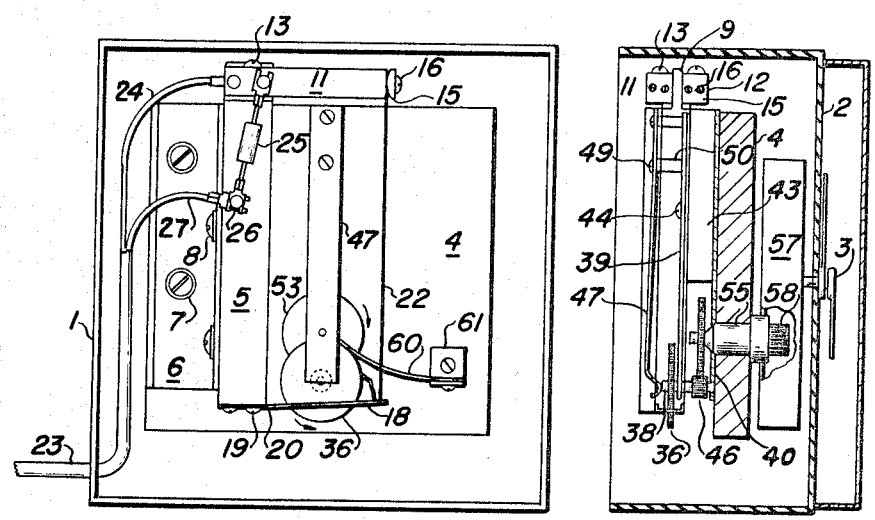
Figure 7:
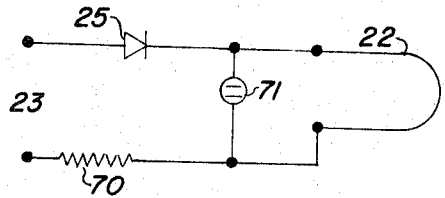
Figure 8:
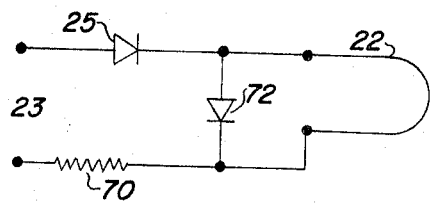
Figure 10:
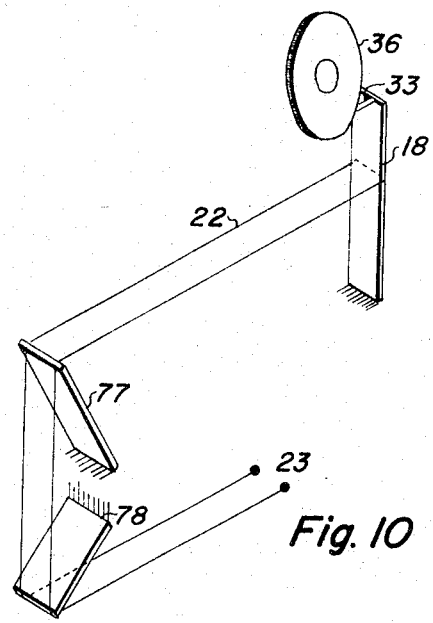
Figure 9:
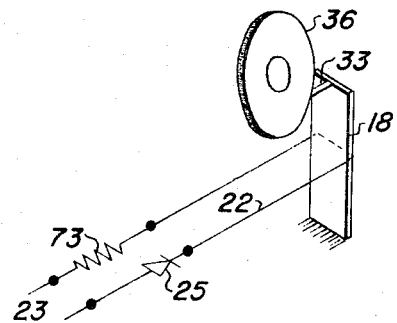
Figure 5:
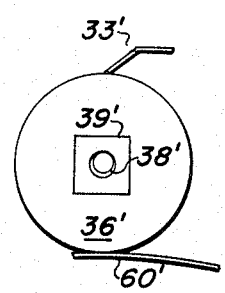
Figure 6:
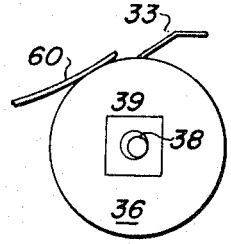

Other objects and advantages of the invention will become apparent as the description proceeds when taken in connection with the accompanying drawing wherein:

FIG. 1 is an exploded isometric view of my electro-thermal synchronous drive mechanism, FIG. 2 is a rear elevation of the clock of FIG. 1 showing my new electro-thermal synchronous drive mechanism, FIG. 3 is a side elevation of the mechanism illustrated in FIG. 2, shown partly in section, FIG. 4 is a partial enlarged scale plan view of the ratchet and pawl driving mechanism of my electro-thermal motor, FIGS. 5 and 6 are schematic views showing a bearing clearance arrangement characteristic of my invention, FIGS. 7 and 8 are schematic electrical diagrams of forms of my invention providing voltage variation compensation means, FIG. 9 is another schematic diagram showing another method of compensating the driving mechanism for line voltage variation, FIG. 10 is a further schematic view illustrating a method of utilizing a long length driving wire in a small space, and FIG. 11 is a front elevational view of an electric clock.

Referring now to FIGS. 1 to 4 and 11, I have illustrated an electric clock having a casing indicated generally by the reference character 1. Casing 1 is provided with a conventional clock face 2 and hands 3. The casing 1 encloses and supports a mechanism frame 4 which forms the support upon which all the mechanical parts of the clock mechanism are mounted and supported. The frame 4 is supported and secured in the casing 1 in any desired manner.

The frame 4 supports a pedestal 5 of electrical insulating material such as, for example, as a hard phenolic plastic. The pedestal 5 is secured to an angle bracket 6 by screws 8 which extend through one leg of bracket 6 into pedestal 5. The other leg of angle bracket 6 is secured to the frame 4 by studs 7.

The upper end of the pedestal 5 has a projecting tongue 9 which serves to separate a pair of horizontally projecting mounting and conductor bars 11 and 12. One end of each of the conductor bars 11 and 12 is secured to the upper end of pedestal 5 on opposite sides of tongue 9 by any suitable means such as vertically extending mounting studs 13.

The outer end of each of the bars 11 and 12 is provided with a pressure clamp consisting of a curve faced pressure plate 15 adapted to be screwed tightly against the end of its associated bar by means of the stud 16.

The lower end of the pedestal 5 supports an elongated and the channel section. The spring 20 bases member 18 having a flat end portion secured by studs 19 to the bottom portion of the pedestal 5. The pawl carrier 18 is preferaly made of stainless steel or springy brass, about 0.004 inch thick. Member 18 has a small flat spring section 20 interposed between the flat section secured to pedestal 5 and the channel section. The spring 20 biases member 18 in a clockwise direction as viewed in FIG. 2. The section 20 forms a pivoting spring for a purpose to be more fully described hereinafter.

A loop of fine wire 22 of a material such as stainless steel or nickel chromium heater wire alloy is looped around the outer end of the member 18 and anchored by members 15 on the ends of the conducting and support members 11 and 12. This loop of wire 22 is formed of wire having dimensions and characteristics set forth more fully hereinafter.

In applying wire 22 the apparatus is turned upside down from the position illustrated in FIG. 2, a loop of the wire is then placed around the base of member 18 and small weights are attached to the dangling ends of the loop of wire on each side of member 18 and below the support members 11 and 12. These weights will be of the order of a few grams to provide initial tension in the wire and to tension the spring section 20 of member 18. The dangling ends of the wire are then brought under the clamping plates 15 on the ends of members 11 and 12 respectively after which the studs 16 are driven home to securely anchor the wire in the condition of tension imposed by the weights and the stress in the spring section 20 of member 18. After this operation is completed the ends of the wire projecting below members 11 and 12 are severed to complete the wire installation procedure.

Energy is supplied to the wire 22 from a service line 23. One service line wire 24 is secured to a suitable terminal on the conducting bar support 12 for direct connection of the wire 22 to the line. The other side of the loop of the wire 22 which is connected to the conducting bar support 11 is energized through a diode 25 connected between bar 11 and a terminal 26 on the pedestal 5 to which the other service line wire 27 is secured. The member 25 may be any suitable or preferred form of rectifying device, as shown herein it is simply a solid state diode.

The outermost end of the member 18 adjacent the portion thereof around which the wire 22 is looped carries a pawl indicated generally by the reference character 30.

The pawl and ratchet mechanism is shown in greatly enlarged scale in FIG. 4. The pawl structure 30 is channel shaped in section having an angularly bent flat mounting section 31 and a projecting tooth 33 forming the pawl proper. Section 31 is suitably secured as by soldering or cementing within and directly to the outer end of the bight portion of the channel shaped member 18. A small unchannelled curved section 32 of the pawl forms a pivot spring between the channel shaped section 30 and the anchoring section 31. The spring section 32 biases the pawl 30 counterclockwise as viewed in FIG. 4.

The pawl element 30 is arranged to drive a ratchet wheel 36 having extremely fine peripheral teeth 37. These teeth have a pitch for example of 500, that is if the wheel 36 is a half inch in diameter there are 250 teeth on its periphery, each tooth having a span of 0.00628 inch. These teeth have a maximum radial depth of about 0.003 inch.

The ratchet wheel 36 is designed to be accurate and yet economical to produce. I have found it desirable to make this wheel as a plastic molding to reduce its mass and to avoid all machining operations on the wheel itself. The plastic material may, for example, be an acetal plastic sold under the trade name "Delrin" or a polyamide plastic material.

The plastic ratchet wheel 36 is pressed onto a spindle 38 which is journaled in a pair of spaced apart, thin brass supporting plates 39 and 40 respectively. The bearing plates 39 and 40 are maintained in spaced relation by a spacer plate 43 and the three plates 39, 40, and 43 are rigidly secured to the frame member 4 by means of a stud 44.

The spindle 38 extends through suitable openings in the bearing plates 39 and 40 so that its inner end bears against the frame 4. A small pinion gear 46 is press fitted on the spindle 38 between the bearing plates 39 and 40.

The spindle 38 is maintained in engagement with the frame plate 4 and in position in its bearings in the plates 39 and 40 by means of an elongated light spring member 47 having a lower free end bearing against the free end of spindle 38. The member 47 is rigidly secured to the upper end of the spacer plate 43 by means of studs and spacer collars 49 and 50 respectively.

As is shown more clearly in FIG. 4 the ratchet wheel 36 projects through a slot 52 formed in the bight portion of the channel shaped member 18. It is not essential for the ratchet wheel to project through the pawl carrying member but it is a compact assembly of the parts and insures that the pawl member 33 will engage the ratchet teeth at a desirable point without requiring a long length of material in the pawl member 30.

The pinion 46 engages a gear 53 rigidly secured on a shaft 54 which in turn is carried by a bearing structure 55 press fitted or otherwise suitably secured in the frame 4. The end of the shaft 54 which extends through the bearing in the frame 4 carries a pinion 58 on its outer end which meshes with a suitable gear in a standard clock gear reduction train, shown here simply as a box 57, which in turn is connected to drive the clock hands 3.

I have found it desirable to insure that the ratchet wheel 36 will come to a complete stop after each feeding stroke of the pawl. To accomplish the foregoing end I have provided a light weight spring member 60 having a free end portion which bears on the circumferential surface of the ratchet wheel 36. The opposite end of the spring 60 is anchored in any suitable way to frame 4 as by being screw and bolt secured to a block 61 which in turn is bolted to the frame 4.

The point of application of the force of spring 60 to the wheel 36 is within a small arc of the point at which the driving impulse of the pawl 33 is applied to the wheel 36.

When line 23 is connected to an A.C. source of electrical energy, the wire 22 heats and expands during each half wave passed by the diode and as the wire 22 expands the spring tension at point 20 of member 18 drags the pawl 30 downwardly as viewed in FIGS. 2 and 4 with the pawl element 33 riding over the angled flanks of one ratchet tooth and dropping onto the next succeeding tooth in a position to engage the radial flank thereof for a driving impulse when such is applied by the wire as it contracts when cooling during the half cycle of current not passed by the diode.

The driving stroke of the pawl is applied as the wire cools and lifts the member 18 against increasing tension of spring section 20 to apply a driving impulse to the wheel 36 and to advance the wheel a distance equal to one tooth thereof. In a motor of this kind the fine wire 22 is exposed to the air as shown in the drawing and readily heats and cools through a wide temperature range, 60 times per second if it is excited by 60 cycle alternating current.

Referring to FIGS. 5 and 6 there are shown a pair of similar enlarged scale views illustrating certain vital relations between pawl, drag spring and bearing structure which have been found to be of great significance in the design of apparatus according to the present invention.

The parts in FIG. 5 corresponding to parts of the apparatus heretofore described are given the same reference characters distinguished by the addition of a prime. In FIG. 5 certain of the parts are in a position other than that shown in FIGS. 1 to 4 and 6. In FIGS. 5 and 6 the bearing plates 39, 39' are shown as squares of smaller size than the ratchet wheels 36, 36' in order to facilitate illustration. As shown in FIG. 5 at the points of application of the pawl 33' and drag spring 60' are diametrically opposed. The clearance between the spindle 38' and the bearing journal hole in the member 39' is exaggerated. With the foregoing conditions the pressure of the drag spring 60' will push the spindle 38' against the top side of the bearing hole in the plate 39'. Consequently a driving thrust of the pawl 33' which would tend to rotate the wheel 36' in a counterclockwise direction will also cause the wheel and spindle assembly to pivot about the point of contact between spring 60' and wheel 36'. If the clearance between the spindle 38' and bearing 39' is of any significance, the travel of the pawl pivoting the assembly about the point of contact with spring 60' will be approximately twice this clearance. With ordinary manufacturing processes this clearance may amount to as much as two-thousandths of an inch in which event the pawl will be able to travel nearly four-thousandths of an inch without rotating the wheel 36' about its axis. As will be brought out more fully hereinafter the actual driving stroke of the pawl, after contact between pawl 33 and the radial flank of a tooth, may be 0.00628 inch. Consequently, a four-thousandth of an inch movement of the pawl without producing rotation of the wheel 36' is a major portion of the movement of the pawl and is sufficient to cause the apparatus to fail to index or to operate out of synchronism.

The preferred relations of the parts are illustrated in FIG. 6. It is readily apparent that the point of application of the spring 60 is made as close to the point of application of pawl 33 to the ratchet wheel 36 as is practically feasible. By making the point of application of spring 60 to the ratchet as close to that of the pawl as is reasonably possible the wheel does not tend to pivot about the contact point of spring 60 but to rotate on the bearing in plate 39 with spindle 38. The apparatus of FIG. 6 has the same amount of clearance as the apparatus of FIG. 5; however, in the FIG. 6 arrangement even an excessive amount of clearance between bearing spindle 38 and plate 39 does not throw the apparatus out of synchronism as the spring 60 maintains the spindle 38 in fixed relation to plate 39 and any driving thrust applied to the ratchet wheel by the pawl 33 results in actual rotational movement of wheel 36.

It is desirable to make the point of application of spring 60 and pawl 33 as close together as possible; however, satisfactory results have been obtained as long as the points of application of these two elements are within 90 degrees of each other. As the angle between the points of application of the pawl and drag spring increases, the rocking effect of the ratchet wheel on the spring becomes more and more a factor tending to produce erratic (non-synchronous) operation of the ratchet and pawl assembly.

It is important to note also that the force of the spring 60 is applied to the peripheral surface of the ratchet wheel 36 in a direction normal to its axis of rotation. By thus applying the force of the spring 60, this spring tends to maintain the ratchet wheel in a proper plane of operation and with no tendency to cock the wheel off at an angle other than that which is produced by such clearance as may exist between members 38 and 39.

In ordinary commercial household service the line voltage may fluctuate a considerable amount over a long period of time due to changing conditions of distribution and the load which may be on the distribution system as well as variations in the electrical load in an individual household. If, for example, the line voltage should rise say from a nominal value of 120 volts to 130 volts an appreciable difference in the maximum temperature to which the wire 22 is heated will result. The foregoing difference will exhibit itself as an elevation of the maximum temperature reached by the wire without a linearly corresponding change in the minimum temperature to which the wire cools between succeeding cycles of energy; i.e., the net result is effectively to change the length of the driving stroke which the wire 22 imparts to the pawl 33 to move the ratchet wheel 36. A considerable deviation in voltage of this character can be tolerated without causing the mechanism to lose synchronism as any excursion of the pawl greater than the pitch of a single tooth and less than the pitch of two teeth results only in the advance by a single tooth pitch on each power stroke. The circuit diagram of FIG. 7 illustrates an arrangement by which the apparatus can be protected against undesirably wide voltage variations. For this purpose the wire 22 will be designed preferably to give an excursion greater than one tooth and less than two teeth on the pawl when the line voltage is close to some expected minimum value. One side of the wire 22 is connected as before through a current limiting diode 25 to one side of the line. The other side of the wire 22 is serially connected through a current limiting resistor 70 to the other side of the line. A voltage regulating device such as a neon glow tube 71 is then shunted across the terminals of the wire 22. The voltage regulating tube is selected to fire when the line voltage exceeds some preselected value. Any voltage excursion above that value causes the glow tube 71 to conduct, which increases current flow and voltage drop through the resistor to limit the voltage applied to the wire 22. The resistor 70 also limits maximum current through the shunt combination 71–22.

FIG. 8 illustrates a configuration very similar to that of FIG. 7 except that in this case the current limiting device consists of a Zener diode 72 which has the property of conducting when the voltage across its terminals exceeds a predetermined value. This modification functions similarly to the FIG. 7 circuit.

In FIG. 9 a third method of compensating for line voltage variations is indicated. In this case a series resistance 73 is inserted in circuit between one end terminal of wire 22 and one of the line terminal connections. The resistance 73 is made of material such as nickel or alloys which have a significantly large positive temperature coefficient of resistance. The resistor 73 is preferably a fine wire suspended in air, the diameter of which can be much larger, the same diameter or even smaller than that of wire 22. If it is much larger, the temperature of resistor 73 will fluctuate very little during a cycle but will change appreciably after the average current through the circuit changes in response to a change in applied voltage. In such case there is a delay of several cycle periods between a change in applied voltage and the change in temperature of resistor 73. After this delay the effect of the temperature change of resistor 73 is to reduce the magnitude of the change in current through the circuit compared to the change in voltage that has occurred. A wider range of line voltage variation can thus be tolerated. Reducing the diameter of the wire of resistor 73 has the effect of reducing the delay time during which the circuit adjusts to a new level of operating voltage. As the wire diameter of resistor 73 is reduced down to a size approximately that of wire 22, the delay time is reduced to a fraction of one cycle period. Even rapidly occurring transient variations in applied voltage are then effectively compensated thereby. The choice of material for wire 73 is wide as this wire is not mechanically stressed.

In FIGS. 1 to 4 I have illustrated the drive wire as a single loop. The length of the wire 22 is determined by a number of factors to be more fully considered hereinafter. With nickel chromium heating wire alloy of the order of one-half mil diameter, the length of the wire is such that it can be accommodated in most ordinary bedroom clocks. In other circumstances the length of the loop may be more than can conveniently be accommodated. An arrangement is illustrated in FIG. 10 by which a long effective length of wire can be accommodated in a reduced effective longitudinal dimension.

In this construction it is desired to conserve space, particularly the maximum linear distance between the member 18 and the point of wires 22 most remotely positioned therefrom. For this purpose the legs of the loop of wire 22 are bent into a generally U-shape with the corners of the legs of the loop passing over and being supported by very light, soft cantilever springs 77 and 78, each of which is mounted in any suitable manner on the supporting frame of the mechanism. As illustrated, the length of the spring 77 exceeds that of the spring 78. This is because the spring 78 must flex a distance which is determined by the absolute value of the contraction and expansion between the point of its junction with the wires and the fixed terminals 23 whereas the spring 77 must not only accommodate this factor but also the contraction and expansion of that portion of the wire which lies between the springs 77 and 78. The relative length of the spring elements 77 and 78 is linearly related to the relative length of the above mentioned sections of the wire loop 22. It is readily apparent that the arrangement of FIG. 10 materially reduces the maximum dimension which must be provided in order to accommodate the required length of wire 22.

In the foregoing description of my invention I have referred to characteristics of the thermal wire, ratchet wheel and pawl assembly which are significant to the design of a practically working drive motor which will operate reliably in synchronism with the frequency of the applied alternating current.

Successful operation of my thermal wire drive means depends on the selection of a drive wire which, when exposed to ambient air (room temperature) and energized with unrectified sinusoidal alternating current at 60 cycles per second, will heat and cool within $\frac{1}{120}$ second. I have successfully operated nickel chromium resistance wire drive means in this manner. In this case the wire heats and cools through a wide temperature range during each excursion of the current above or below electrical neutral. To accomplish the foregoing the wire begins to increase in temperature only after the current has departed from electrical neutral. During the initial period of current flow heat is being added to the wire by the electric current at a low rate which is less than the rate of heat loss and there is a net loss of heat, hence a reduction of temperature at this time. Subsequently, the rate of heat input and heat loss becomes equal and the wire temperature thereafter rises as the current increases. The peak wire temperature occurs after the current has passed its peak value as the rate of heat input is still in excess of the rate of heat loss. As the current diminishes from its peak value a point is reached where the rate of heat input and loss is again equal, after which the temperature of the wire drops to its minimum value.

I prefer to use rectified alternating current to energize the drive wire as this halves the number of heating cycles per second and, hence, the speed of the ratchet wheel. In the case of 60 cycles per second half-wave rectifier alternating current at 120 volts, energy is applied to the wire only on alternate half cycles of the alternating current supply and the net cooling period exceeds the net heating period because the wire is losing heat when the current is low at the beginning and end of the sinusoidal half-wave of applied current. This relatively long cooling period permits a wide temperature swing of about 300° to 400° F. with a peak temperature below 1000° F. using wire having a diameter on the order of one-half mil.

Many factors influence the choice of driving wire. Wire of high resistivity, high resistance to oxidation, high strength at elevated temperatures and high resistance to creep is preferred. Though the actual load on the wire may be only a few grams, the unit stress may be of the order of 30,000 p.s.i. Stainless steel and nickel chromium heater alloy wire fulfill the conditions required. As the specific resistance of the wire is increased the length required to effect the necessary expansion and contraction between maximum and minimum operating temperatures is decreased.

My investigations have empirically shown that the ratio of operating temperature change to peak temperature (not over 1000° F.) increase over ambient temperature of the wire when energized by half-wave rectified alternating line current at 120 volts and 60 cycles increases rapidly as the wire diameter decreases. This ratio is approximately 10%, 20%, 26% and 46% for wires having diameters of 0.0015", 0.001", 0.0008" and 0.0005" respectively. This relationship also establishes that wire having a diameter such that it cannot heat and cool during one cycle, when energized as specified, sufficiently to be of practical value is quickly reached as the wire diameter is increased above 0.0015".

The above mentioned temperature-diameter relations have produced an empirical formula as follows:

$$\frac{T_{max} - T_{min}}{T_{max} - T_{ambient}} = 0.18 a^{-0.62}$$

$T_{max}$ is the maximum temperature reached by the wire during the operating cylcle. $T_{min}$ is the minimum operating temperature between heating pulses. $T_{ambient}$ is the ambient temperature and $a$ is the cross-sectional area of the wire is microsquare inches. This relationship indicates that a wire of about 0.00028 inch diameter would have a 100 percent temperature swing; i.e., that value of $a$ where $T_{ambient}$ and $T_{min}$ become equal or the left side of the foregoing equation equals 1 which would occur when the 0.62 power of the cross-sectional area of the wire equals 0.18.

The smaller the diameter of the drive wire (and hence its cross-sectional area and mass and surface area per unit of length) the greater temperature range over which it may be operated. I have found the rate of heat loss per unit of length of very small diameter wire at a given ambient temperature varies roughly in proportion to the square root of the diameter (or mass) of the wire. Hence, a high rate of heat input may be maintained with very fine wires because of their high rate of heat loss. The heat storage capacity of a wire and the mass per unit length decreases as the square of the diameter. Thus, only a small quantity of heat is required greatly to change the temperature of a very fine wire. A high rate of heat input to such wires when current is applied in a fluctuating manner produces wide temperature fluctuations in synchronism with the current. The foregoing has been used when the wire undergoes 120 cycles per second (unrectified input). Also, the change in length of the wire per unit of length increases as the diameter decreases. For any given excursion of the pawl a reduction in wire diameter is accompanied by a reduction in wire length. The power input (half-wave rectified) is equal to the square of the voltage divided by twice the total resistance. The total resistance of the wire increases as the diameter decreases even when accompanied by a corresponding reduction in the length of the wire because the total resistance varies linearly as the wire length and inversely as the square of the wire diameter. Hence, the power input is reduced for a given excursion of the pawl as the wire diameter decreases. That is, a reduction in wire diameter improves efficiency and increases the percentage of input power which produces useful work. With small diameter wires a ratio of total working length to diameter not less than approximately 10,000 is a practical relation. Assuming a peak temperature of 900° F. and an ambient of 70° F., a wire of 0.0015" diameter will have a minimum operating temperature of about 817° F. and a wire of 0.0005" diameter will have a minimum operating temperature of about 520° F. The temperature swings per cycle are 83° F. and 380° F. respectively. Wider temperature swings per cycle are realized with still smaller diameter wires. About 0.0025 inch is a practical maximum wire diameter within the limits of reasonable length, power and pawl tooth size.

The foregoing relations establish basic criteria for practically useful low power synchronous motor drive wires. The term "fine wire" as used herein and in the claims means a wire which, when energized by alternating current of about 50 to 60 cycles per second, will heat and cool during each cycle synchronously with the applied current sufficiently to produce useful motion within reasonable total lengths of wire and power input.

Throughout this specification and the appended claims reference is made to the diameter of the wire on the assumption that the wire is circular in cross section, but the term is to be understood as encompassing wire of other cross section.

The expansion or heating cycle of the wire does no useful work on the ratchet wheel, the wire merely expands and the spring section of the pawl arm keeps the wire taut while withdrawing the pawl and reducing the tension in the wire. At the end of the heating cycle the wire cools and pulls the pawl against the spring and imparts driving motion to the wheel. The tension in the wire thus increases as the temperature of the wire decreases.

The arrangement by which the pawl operates on the cooling stroke of the wire is preferred as the wire stress is increasing at this time while its temperature is dropping, thus the wire is under its maximum stress when it is at low temperature. The lower the temperature the greater the intrinsic strength of the wire and the less likely it is to be subjected to creep deformation.

Though the actual forces exerted by the wire in the examples given above are very small, the stresses are of a high order of magnitude. For example, considering a nichrome wire having a diameter of one-half mil and a total length of approximately 7 inches, the wire will be stressed in the range of 30,000 p.s.i. at ambient temperature and this stress will be reduced to a value of the order of 10,000 p.s.i. when the wire reaches its maximum temperature. My mechanism will operate satisfactorily when arranged so that the working stroke of the pawl occurs when the wire is expanding and the energy to move the ratchet is supplied by the spring in the pawl carrier. However, I prefer not to use this arrangement as it causes the stress when the wire is at maximum temperature to be at an elevated value due to the fact that the spring must be tensioned sufficiently not only to maintain the wire taut but to deliver driving power to the ratchet wheel under these conditions.

From the considerations set forth above it will be apparent that the limits of the excursion of the pawl 33 are determined by the values of maximum and minimum temperature of the wire during its operating cycles. On the other hand, the length of the pawl excursion is determined by the difference between the maximum and minimum temperatures regardless of what they may be. For this reason the frictional drag spring 60 arrangement of stopping the ratchet wheel at the end of each driving stroke of the pawl is preferred. If the maximum and minimum temperatures shift while maintaining an essentially constant difference therebetween, the point of action of the pawl shifts but its total driving length of excursion per heating cycle remains constant. Hence, the number of teeth advanced per cycle of the applied current remains constant.

As illustrated herein and as preferred by me the ratchet wheel consists of a very light, thin section, molded plastic disc though the wheel might be made of other substances and the teeth might be formed by machining, coining or other process rather than molding. Molding is preferred as an economical method of producing these ratchet wheels having teeth of the order of six thousandths of an inch in pitch.

Due to the rapidity, 60 cycles per second, of pawl stroke the relatively small amount of power available, somewhat less than 4 watts, and the small excursion of the driving pawl, between 7 and 12 thousandths of an inch, in the illustrated embodiment of the invention, the inertia of the ratchet wheel 36 must be as small as possible. When the pawl imparts a driving pulse to the ratchet wheel the inertia of the wheel tends to make it continue in motion after the driving thrust of the pawl is completed. I have found it possible to run motors of this type synchronously under conditions such that the inertia of the wheel keeps it in continuous rotation. The pawl speeds up the wheel during each driving stroke and the wheel slows down on the return stroke of the pawl due to friction in the driven system, the return dragging friction of the pawl and the friction of the drag spring. I find it preferable to bring the wheel to a complete stop as nearly after the termination of a forward driving impulse of the pawl as is possible. For this purpose the friction of the drag spring must be great enough quickly to absorb and dissipate as friction the energy represented by the inertia of the wheel in motion at the termination of a driving pulse. The inertial energy is not entirely absorbed by the spring 60 as the pawl tooth riding backwards on the non-radial surface of the ratchet tooth absorbs some of the energy as friction and the friction in the mechanism also helps absorb the inertial energy.

I have found that reliable synchronous operation of motors such as is disclosed herein is best obtained if the natural frequency of the moving system and its components are higher than the frequency of the applied current. If the natural frequency of the system and its parts is close or equal to the line current frequency, maximum amplitude conditions prevail but the system becomes load sensitive as the two frequencies approach each other since the load damps the motion of the parts. Since even clock loads will vary from clock to clock and even with position as well as wear and lubrication conditions, synchronism is not reliably maintained unless the amplitude of parts' motion is relatively insensitive to load variations. I have found as a practical matter that the system and its parts maintain synchronism when each has a resonant frequency at least 40% above frequency of the energizing current when operating on rectified (half-wave) alternating current, or at least 40% above twice the frequency of the energizing current when operating on non-rectified (full-wave) alternating current. A further precaution is that the natural frequency of the system and its parts must not closely approach a harmonic of the line frequency, because harmonics often present in household alternating current may cause high amplitude motion of parts of the electro-thermal motor at a harmonic frequency, which tend to interfere with or may override the fundamental motion desired of these parts.

The mass and stiffness of the driving wire is essentially established by other design considerations. The force which the spring in the pawl carrier 18 exerts on the wire under the varying conditions met in operation is determined principally by the characteristics desired for the wire itself. In the operation of the device the essentially greatest mass which is operative in the system occurs during the driving stroke and is the mass of the ratchet wheel itself. The resonant frequency of such a system is a function of the mass of the ratchet wheel and the stiffness of the driving system. The resonant frequency of the driving system may be increased by increasing the stiffness of the driving system or by reducing the mass of the wheel. Increasing stiffness of the driving system may require complete change in the design of the wire and pawl assembly so it is more practical to decrease the mass of the wheel. I have found for the type of system herein described for operation on 60 cycle half-wave rectified current that the herein described plastic wheel of approximately one-half inch diameter and of less than a gram mass has a resonant frequency sufficiently far above 60 to operate with complete reliability on 60 cycle energization.

My above described thermal motor operates continuously in complete synchronism with the frequency of the applied alternating current and is thus ideally suited to drive low level loads requiring synchronous motor drive such as clocks. My motor is also very economical in that its power consumption is in the range of one to four watts.

I claim:
1. An electric motor comprising:
 (a) support means,
 (b) a drive system including:
  (aa) a ratchet wheel rotatably mounted on said support means,
  (bb) an electrically conductive wire supported by said support means,
  (cc) a pawl drivingly connected to said wire and positioned for driving engagement with said ratchet wheel when oscillated by movement of said wire,
 (c) a source of high frequency alternating current having a frequency of 50 to 60 cycles per second connected to said wire,
 (d) said wire being constructed and dimensioned so that it heats and expands with rising current flow from said current source and cools and contracts with falling current flow from said current source without breaking the circuit between said wire and said current source.
 (e) said wire being constructed and dimensioned so that it expands and contracts synchronously with the frequency of the current applied thereto from said current source,
 (f) whereby said pawl is oscillated by said wire in synchronism with the frequency of the current applied to said wire.

2. An electric motor according to claim 1 wherein said wire is substantially circular and has a diameter less than 0.0025 inch.

3. An electric motor according to claim 1 wherein said wire has a cross-sectional area less than 0.00000625 and a ratio of surface area to cross-sectional area which is not less than 36,000 to one.

4. An electric motor according to claim 1 wherein a half wave rectifier in series connected in circuit between said wire and said source of current whereby said wire is energized only by alternate half cycles of current from said current source.

5. An electric motor according to claim 1 wherein a resistance wire having a rising temperature coefficient of resistance is connected in series with said wire to minimize the effects of voltage variation on said wire.

6. An electric motor according to claim 1 wherein said wire is exposed to atmosphere and is constructed so that it undergoes a temperature change of not less than 100° F. per heating and cooling cycle.

7. An electric motor according to claim 1 where said drive system is constructed so that its minimum resonant frequency is at least 40% greater than the frequency at which said pawl is oscillated.

8. An electric motor comprising:
(a) support means,
(b) a drive system including:
  (aa) a ratchet wheel rotatably mounted on said frame,
  (bb) electro-mechanical driving means mounted on said frame for reciprocation when energized by a periodically varying current,
  (cc) a pawl drivingly connected to said driving means and positioned for driving engagement with said ratchet wheel when oscillated by said driving means,
(c) a source of periodically varying current connected to said driving means,
(d) said driving means being constructed so that it is reciprocated by current applied thereto in synchronism with the frequency of the applied current without breaking the circuit between said driving means and said current source,
(e) said driving means being constructed so that it oscillates said pawl in synchronism with the frequency of the current applied to said driving means, and
(f) said drive system being constructed so that its minimum resonant frequency is at least 40% greater than the frequency at which said pawl is oscillated.

9. An electric motor according to claim 8 wherein said source of current is high frequency alternating current having a frequency of 50 to 60 cycles per second.

10. An electric motor according to claim 9 wherein a half wave rectifier is series connected in circuit between said driving means and said source of current whereby said driving means is energized only by alternate half cycles of current from said current source.

References Cited by the Examiner
UNITED STATES PATENTS

| | | | |
|---|---|---|---|
| 954,682 | 4/1910 | Low | 58—23 |
| 1,527,140 | 2/1925 | Jamin | 310—4 X |
| 1,795,013 | 3/1931 | Denman | 310—4 X |
| 1,804,709 | 5/1931 | Shoenberg | 310—4 X |
| 1,916,409 | 7/1933 | Bourgeois | 310—4 X |
| 2,009,601 | 7/1935 | Anderson | 310—4 X |
| 2,203,719 | 6/1940 | Crane | 310—4 X |
| 2,221,863 | 11/1940 | Crane | 58—23 |
| 2,555,882 | 6/1951 | Guajardo | 310—4 X |
| 2,722,613 | 11/1955 | Culbertson | 310—4 X |
| 2,729,756 | 1/1956 | Euler | 310—4 X |
| 2,935,628 | 5/1960 | Taylor | 310—4 X |

MILTON O. HIRSHFIELD, *Primary Examiner.*

ORIS L. RADER, *Examiner.*

J. W. GIBBS, *Assistant Examiner.*

UNITED STATES PATENT OFFICE
CERTIFICATE OF CORRECTION

Patent No. 3,275,858                                              September 27, 1966

Christian D. Berger

It is hereby certified that error appears in the above numbered patent requiring correction and that the said Letters Patent should read as corrected below.

Column 1, line 21, after "household" insert -- current supply. The wire expands and contracts --; line 22, strike out "it will exhibit a wide range temperature excursion"; column 2, line 24, strike out "and the channel section. The spring 20 bases" and insert instead -- channel shaped sheet metal pawl carrying --.

Signed and sealed this 22nd day of August 1967.

(SEAL)
Attest:

ERNEST W. SWIDER                                EDWARD J. BRENNER
Attesting Officer                              Commissioner of Patents